United States Patent [19]

Bohm et al.

[11] 4,197,377

[45] Apr. 8, 1980

[54] THERMOPLASTIC ELASTOMER COMPOSITIONS

[75] Inventors: Georg G. A. Böhm, Akron; Gary R. Hamed, Uniontown; Lee E. Vescelius, Akron, all of Ohio

[73] Assignee: The Firestone Tire & Rubber Company, Akron, Ohio

[21] Appl. No.: 914,252

[22] Filed: Jun. 9, 1978

Related U.S. Application Data

[63] Continuation-in-part of Ser. No. 806,036, Jun. 3, 1977, abandoned.

[51] Int. Cl.$^2$ .................... C08L 9/06; C08L 23/04
[52] U.S. Cl. .................................... 525/99; 525/98; 525/233; 525/241
[58] Field of Search ............. 260/876 B, 889; 525/98, 525/99

[56] References Cited

U.S. PATENT DOCUMENTS

| | | | |
|---|---|---|---|
| 2,994,677 | 8/1961 | Bohnert et al. | 260/889 |
| 3,676,386 | 7/1972 | Brenner et al. | 260/876 B |
| 3,701,702 | 10/1972 | Shichman et al. | 260/897 |
| 3,793,283 | 2/1974 | Frailey et al. | 260/889 |
| 3,850,474 | 11/1974 | Welch | 260/876 B |
| 4,031,166 | 6/1977 | Bronstert et al. | 260/876 B |

FOREIGN PATENT DOCUMENTS

| | | | |
|---|---|---|---|
| 47-26369 | 7/1972 | Japan | 260/889 |
| 50-80285 | 6/1975 | Japan | 260/889 |
| 1031132 | 5/1966 | United Kingdom | 260/889 |

*Primary Examiner*—Wilbert J. Briggs, Sr.

[57] ABSTRACT

Thermoplastic elastomer compositions of the present invention comprise a blend of from about 10 to about 48 parts by weight of a crystalline 1-olefin polymer, from about 90 to about 10 parts by weight of a styrene-butadiene rubber, and a triblock copolymer or a diblock copolymer in the amount of from about 0.1 to about 80 parts by weight or a polystyrene in the amount of from 0.1 to about 50 parts by weight. The thermoplastic elastomer blends have good physical properties, especially tensile strength, elongation at break, and tear strength. Moreover, the compositions can be repeatedly processed and yet maintain their good physical properties. The compositions, which may be partially cured, have excellent aging properties as well as paint adhesion.

51 Claims, No Drawings

THERMOPLASTIC ELASTOMER COMPOSITIONS

BACKGROUND OF THE INVENTION

The present invention relates to thermoplastic elastomer compositions made from blends of 1-olefin polymers such as polypropylene, styrene-butadiene rubber, and a triblock copolymer such as styrene-butadiene-styrene or a diblock copolymer such as styrene-butadiene or a polystyrene polymer, with the compositions requiring no curing or vulcanization to develop elastomeric properties. Additionally, the invention also relates to partially cured compositions.

Heretofore, a few specific types of thermoplastic elastomers have been known. The term "thermoplastic elastomer" has generally been applied to elastomers which can be readily processed and reprocessed, molded, or the like by common or conventional thermoplastic methods and which do not require vulcanization to develop the various physical properties.

A recently developed type of thermoplastic elastomers is a blend of polypropylene and EPDM (ethylene-propylene-nonconjugated diene monomer), as described in U.S. Pat. Nos. 3,758,643; 3,806,558; and 3,862,106 to Fischer of Uniroyal, Inc. These blends are partially cured and contain EPDM in amounts up to 90 percent by weight. It is not surprising that blends of EPDM and polypropylene form a material having good mechanical properties since, due to the fact that EPDM contains a large number of monomer units in its backbone identical to those in polypropylene, there is good compatibility between these two polymers.

Various prior art patents apparently disclose blends of 1-olefin polymers and rubbers. However, these patents fail to suggest a blend containing a triblock copolymer which imparts superior physical properties, or of partially curing such blends, with or without the triblock copolymer. For example, U.S. Pat. No. 3,572,721 to Harrison relates to a golf ball, made from blends of rubber and a thermoplastic. In order to render the ball effective for use, it must be cured.

U.S. Pat. No. 3,665,059 to Mahlman relates to polyphase compositions having, as a continuous phase, a propylene polymer and, as a second phase, a synthetic or natural rubber which are prepared by dispersing a propylene polymer of substantially submicron particle size in the second phase and by fusing the polymer under conditions which assure the formation of the propylene polymer in a continuous phase.

U.S. Pat. No. 3,701,702 to Schichman relates to a method of free curing rubber, whereby the vulcanizate is obtainable by adding to natural rubbers, synthetic rubbers or blends thereof a fiber-forming thermoplastic resin.

The prior art also includes numerous patents which generally relate to thermoplastic compositions made from blends of a triblock copolymer and an olefin polymer. Typical examples include U.S. Pat. Nos. 3,299,174; 3,424,649; 3,689,595; 3,793,283; 3,830,767; and 3,850,474. However, such polymers lack any suggestion of a tricomponent blend containing a styrene-butadiene rubber, as well as the suggestion of partially curing the composition.

U.S. Pat. No. 3,576,911 relates to a polymeric material used for shoe soling which is prepared by blending various polymers. This patent fails to teach the use of a 1-olefin compound as well as any partial curing.

U.S. Pat. No. 4,017,436 basically relates to a thermoplastic resin composition containing a liquid butadiene-styrene copolymer of low molecular weight, 300 to 5,000, and a tackifier. Thus, this patent also lacks the polypropylene polymer as well as any suggestion of a partial cure.

SUMMARY OF THE INVENTION

It is therefore an object of the present invention to provide a thermoplastic elastomer composition comprising a blend of a 1-olefin polymer, a styrene-butadiene rubber, and a triblock or a diblock copolymer or polystyrene.

It is another object of the present invention to provide thermoplastic elastomer compositions, as above, wherein the blends may or may not be partially cured, wherein they have good physical properties without the requirement of any vulcanization, and wherein they may be readily reprocessed and still retain their good physical properties.

It is a further object of the present invention to provide a thermoplastic elastomer composition, as above, wherein the blends are mixed at or above the melting temperature of said 1-olefin polymer.

It is yet another object of the present invention to provide a thermoplastic elastomer composition, as above, wherein said 1-olefin polymer is polypropylene and wherein said triblock copolymer is a styrene-butadiene-styrene copolymer and said diblock copolymer is a styrene-butadiene copolymer.

It is yet another object of the present invention to provide a thermoplastic elastomer composition, as above, which has an exceedingly good tensile strength, elongation at break, tear strength, and good paint adhesion.

In general, a thermoplastic elastomer composition blend, comprises:

from about 10 to about 48 parts by weight of a crystalline 1-olefin polymer, said 1-olefin polymer selected from the class consisting of a homopolymer and a copolymer made from 1-olefin monomers having from 2 to 20 carbon atoms, said homopolymer or said copolymer having a melting point of at least 90° C., from about 90 to about 10 parts by weight of a styrene-butadiene rubber, and a compound selected from the class consisting of a triblock copolymer, a diblock copolymer, and polystyrene, the amount of said triblock and said diblock copolymer ranging from about 0.1 to about 80 parts by weight and the amount of said polystyrene ranging from about 0.1 to about 50 parts by weight, said triblock copolymer and said diblock copolymer made from conjugated dienes having from 4 to 10 carbon atoms and a vinyl substituted aromatic having from 8 to 12 carbon atoms, said blend forming said thermoplastic elastomer.

Additionally, a thermoplastic elastomer composition blend, comprises:

from about 10 to about 48 parts by weight of a crystalline 1-olefin polymer, said 1-olefin polymer selected from the class consisting of a homopolymer and a copolymer made from 1-olefin monomers having from 2 to 20 carbon atoms, said homopolymer or said copolymer having a melting point of at least 90° C., from about 90 to about 10 parts by weight of a styrene-butadiene rubber, and a compound selected from the class consisting of a triblock copolymer, a diblock copolymer, and polystyrene, the amount of said triblock and said diblock copolymer ranging from about 0.1 to about 80 parts by weight and the amount of said polystyrene ranging from about 0.1 to about 50 parts by weight, said triblock copolymer and said diblock copolymer made from conjugated dienes having from 4 to 10 carbon atoms and a vinyl substituted aromatic having from 8 to 12 carbon atoms, said blend being partially cured and having a melt flow index of at least 1.0 so that a thermoplastic elastomer is formed.

Generally, a process for making a thermoplastic elastomer blend composition, comprises the steps of:

providing a blend of a 1-olefin polymer, a styrene-butadiene rubber, and a triblock copolymer having from about 10 to about 48 parts by weight of said crystalline 1-olefin polymer, said 1-olefin polymer selected from the class consisting of a homopolymer and a copolymer made from 1-olefin monomers having from 2 to about 20 carbon atoms, said homopolymer or said copolymer having a melting point of at least 90° C., from about 90 to about 10 parts by weight of said styrene-butadiene rubber, and a compound selected from the class consisting of said triblock copolymer, said diblock copolymer, and said polystyrene, the amount of said triblock and said diblock copolymer ranging from about 0.1 to about 80 parts by weight and the amount of said polystyrene ranging from about 0.1 to about 50 parts by weight, said triblock copolymer and said diblock copolymer made from conjugated dienes having from 4 to 10 carbon atoms and a vinyl substituted aromatic having from 8 to 12 carbon atoms, heating said blend at a temperature at or above the melting point of said crystalline 1-olefin polymer so that a reprocessable thermoplastic elastomer blend is formed.

Additionally, a process for making a thermoplastic elastomer blend composition, comprises the steps of:

providing a blend of a 1-olefin polymer, a styrene-butadiene rubber, and a triblock copolymer having from about 10 to about 48 parts by weight of said crystalline 1-olefin polymer, said 1-olefin polymer selected from the class consisting of a homopolymer and a copolymer made from 1-olefin monomers having from 2 to about 20 carbon atoms, said homopolymer or said copolymer having a melting point of at least 90° C., from about 90 to about 10 parts by weight of said styrene-butadiene rubber, and a compound selected from the class consisting of said triblock copolymer, said diblock copolymer, and said polystyrene, the amount of said triblock and said diblock copolymer ranging from about 0.1 to about 80 parts by weight and the amount of said polystyrene ranging from about 0.1 to about 50 parts by weight, said triblock copolymer and said diblock copolymer made from conjugated dienes having from 4 to 10 carbon atoms and a vinyl substituted aromatic having from 8 to 12 carbon atoms, heating said blend at a temperature at or above the melting point of said 1-olefin polymer, and partially curing said blend to have a melt flow index of at least 1.0 so that a reprocessable thermoplastic elastomer blend is produced.

PREFERRED EMBODIMENTS OF THE INVENTION

Our prior specification relates to uncured or partially cured blends of 1-olefin polymers with styrene-butadiene rubber. Now, it has been unexpectedly found that a triblock copolymer containing repeating units of vinyl substituted aromatic-diene and vinyl substituted aromatic compounds or a diblock copolymer containing repeating units of vinyl substituted aromatic-diene or polystyrene can be added to the 1-olefin polymer and the styrene-butadiene rubber to form a tricomponent blend having surprisingly large improvements in physical properties and which further can be partially cured, even when said tricomponent blend contains large amounts of said triblock copolymer. Thus, the present invention relates to the thermoplastic elastomer tricomponent blend composition wherein much of the following description, naturally, is the same as in the parent specification; for example, with regard to the description of the olefins, the styrene-butadiene rubber, and the like. Nevertheless, for purpose of clarity, the prior specification bearing U.S. Ser. No. 806,036, filed June 13, 1977, is hereby fully incorporated by reference.

The 1-olefin polymer of the thermoplastic elastomer blend composition can be a homopolymer or a copolymer of various 1-olefin monomers having from 2 to 20 carbon atoms. Examples of suitable 1-olefin monomers include ethylene-propylene, 1-butene, 1-pentene, 1-hexene, 1-octene, 4-methyl-1-hexene, 4-ethyl-1-hexene, 6-methyl-1-heptene, and the like. A preferred monomer is ethylene with a highly preferred monomer being propylene.

In addition to the homopolymers, the 1-olefin polymer may be a copolymer made from various 1-olefin monomers. Regardless of whether a homopolymer or a copolymer is utilized, it is an important aspect of the present invention that only 1-olefin polymers or copolymers are utilized which have a melting point of 90° C. or higher. Then, whenever various 1-olefin monomers are utilized in preparing a copolymer, the amount of each must be such that a copolymer is produced having a melting point of at least 90° C. A preferred copolymer is made from a major amount by weight of ethylene monomers and a minor amount of propylene monomers. A highly preferred copolymer is made from a major amount by weight of monomers of propylene and a minor amount by weight of ethylene monomers.

The amount by weight of said 1-olefin polymer component of said tricomponent blend ranges from about 10 parts by weight to about 48 parts by weight, with from about 30 parts to about 42 parts being preferred. The amount of said styrene-butadiene rubber component of said tricomponent blend ranges from about 90 parts to about 10 parts by weight, with from about 70 parts to about 11 parts by weight being desired. A preferred range is from about 65 parts to about 20 parts by weight. The remaining component of the tricomponent blend; that is, the triblock copolymer or the diblock copolymer ranges from about 0.1 to about 80 parts by weight; desirably, from about 0.5 to about 60 parts by weight; and, preferably, from about 0.9 to about 40 parts by weight whereas the polystyrene ranges from about 0.1 to about 50 parts by weight and preferably from about 0.9 to about 20 parts by weight.

The butadiene-styrene rubber component is a random copolymer made from monomers of butadiene and styrene. The copolymer can be prepared in any common or conventional manner well known to the art, such as through solution or emulsion polymerization. Additionally, the specific type of styrene-butadiene rubber may vary. For example, the butadiene portion may contain as high as 90 or even 100 percent of 1,2-polybutadiene or 1,4-polybutadiene. The amount by weight of the butadiene may vary greatly, such as a range of from about 60 percent to about 90 percent by weight based upon the total copolymer being desirable, although larger or smaller amounts may be used. The number average molecular weight of the copolymer may range from about 50,000 to about 1,000,000.

Similarly, the 1-olefin polymer, such as the preferred polyethylene and the highly preferred polypropylene, may be prepared in any common or conventional manner so long as it is largely crystalline, such as an isotactic configuration. Generally, the melt flow index of the isotactic 1-olefin polymer and, especially, isotactic polypropylene can range from about 0.4 to about 30, with a preferred range being from about 2 to about 12, according ASTM No. D1238. Although an isotactic 1-olefin polymer is primarily utilized, an amount such as from 0.1 up to about 15 percent by weight based upon the total weight of the 1-olefin polymer of a low crystalline atactic configuration can also be utilized. Hence, isotactic polypropylene i utilized along with small amounts of atactic polypropylene. Not only are small amounts of the atactic configuration of a particular 1-olefin polymer economical, but they also improve flow and yet do not significantly reduce the various physical properties.

Regardless of the specific type of 1-olefin polymer utilized, the particle size is that produced by normal and conventional polymerization techniques. Generally, the particle size is greater than 1.0 microns and, desirably, larger than 5.0 microns, although any particle size may be utilized. From a practical standpoint, large particles, such as up to 2 mm, may be conveniently utilized as well as even larger particles. Of course, since the 1-olefin polymer is generally blended with the styrene-butadiene rubber on a mill, large particles such as diced polypropylene may be utilized.

The triblock or diblock copolymer of the present invention is made from conjugated dienes having from 4 to 10 carbon atoms and from vinyl substituted aromatic hydrocarbon compounds having from 8 to 12 carbon atoms. Examples of specific diene monomers include butadiene, isoprene, piperylene, 2,3-dimethylbutadiene, hexadiene, and the like. Polyisoprene is desirable and polybutadiene is highly preferred. Specific examples of suitable vinyl-substituted aromatic compounds include styrene, alpha-methylstyrene, ortho-, para-, and meta- methyl or ethyl styrene, and the like. Alpha-methylstyrene is desirable, while styrene is highly preferred. The usual type of triblock copolymer has the structure A-B-A, where the A block is made from a vinyl substituted aromatic monomer and the B block is made from a conjugated diene monomer. Thus, the highly preferred triblock copolymer of the present invention has the structure, polystyrene-polybutadiene-polystyrene. Similarly, the usual type of diblock copolymer has the structure A-B where A and B is as indicated immediately above. Thus, the highly preferred diblock copolymer of the present invention has the structure, polystyrene-polybutadiene. Moreover, it is within the scope of the present invention to utilize a multiple diblock copolymer including a copolymer having the structure (S-B)$_n$ where n is usually 2 through 4 or 5.

However, by the term "triblock copolymer", it is meant to also include linear block copolymers having the general formulation A-B-A-(B-A)$_n$, while the branched configurations may have, among other alternatives, the general structure such as

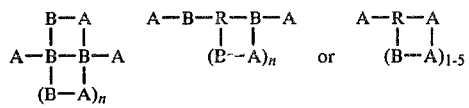

The latter configurations, as well as some linear configurations, may be created by coupling agents employed as alternatives in the block copolymer preparation, another alternative being a sequential process for the block copolymer synthesis. The subscript n has an integer usually between about 0 and 5. The coupling agent residue, if monomeric, is ignored in these general formulae. However, if a polymeric coupling agent such as epoxidized dienes (e.g., epoxidized polybutadiene) is utilized, the symbol R may represent the coupling agent residue.

Generally, the amount of the diene repeating structure in the triblock or diblock copolymers ranges from about 50 to about 90 percent by weight with from about 60 to about 70 percent being preferred. Moreover, if the B block is polybutadiene, from about 0 to about 100 percent and, preferably, from about 9 to about 20 percent 1,2-microstructure is desired. The diene or B blocks have a molecular weight of from about 25,000 to about 200,000, desirably from about 30,000 to about 150,000, and preferably from about 35,000 to about 90,000. In contrast, the vinyl substituted aromatic or A block portion of the block copolymer has a molecular weight of at least 5,000 and desirably from about 7,500 to about 50,000.

The polystyrene is made according to any conventional method and has a molecular weight of at least 5,000 and desirably from about 7,500 to about 100,000.

Of the compounds constituting the third component, the triblock copolymer is preferred.

A blend of the 1-olefin polymer and the styrene-butadiene rubber, whether or not partially cured, results in a thermoplastic elastomer. That is, the blend is considered a thermoplastic elastomer in that it can be repeatedly reprocessed and, if partially cured, does not require further vulcanization to develop elastomeric properties. Thus, the blend can be readily and repeatedly molded, extruded, or otherwise processed since it flows at temperatures at or above the melting point of the 1-olefin polymer. However, it has now been found that the addition of the polystyrene and especially the triblock or the diblock copolymer unexpectedly results in a large improvement of physical properties, especially tensile strength, elongation at break and tear strength. More surprising is the fact that the tricomponent blend can be partially cured to further improve the properties, even when high amounts of the A-B-A block copolymer or the diblock copolymer are utilized since these types of block copolymers require no cure. Generally, a partial cure of the tricomponent blend is preferred in that the physical properties are further improved and exhibit much better aging.

By partial cure, it is meant that the butadiene in the SBR portion of the blend is crosslinked to an extent less than full cure or vulcanization. It is also thought that the butadiene block of the triblock or diblock copolymer will also be partially crosslinked. According to the concepts of the present invention, a partial cure is achieved when the melt flow index (ASTM No. D1238, condition "L", but with the exception that the load is 100 pounds) is at least 1.0 and preferably 10.0 or greater. Blends of the tricomponent blend of the 1-olefin polymer, the styrene-butadiene rubber, and the triblock or diblock copolymer or the polystyrene which are cured in excess of a partial cure and, thus, have a melt flow index below 1.0 result in vulcanized blends or thermoset elastomers which are clearly outside the scope of the present invention. The partial cure may be obtained utilizing any conventional curing agent compound or method as set forth below. Generally, good blends of the present invention will have a melt flow index of from about 90 to about 150 with a preferred melt flow index of approximately 120.

It is a critical aspect of the present invention that the 1-olefin polymer, the styrene-butadiene rubber, and the third component, be it the triblock, the diblock, polystyrene, or any combination thereof, be mixed together at a temperature equal to or greater than the melting point of the 1-olefin polymer. Due to variations in molecular weight and tacticity, the melting point will vary over a small range for the particular 1-olefin polymer. The typical polyethylene will have a melting point range of from about 127° C. to about 140° C., with a typical melting point of approximately 135° C. The melting point range for the highly preferred polypropylene is from about 150° C. to about 175° C. with a practical or typical melting point temperature of about 160° C. Thus, temperatures within this range or desirably above it are necessary to the present invention. The actual blending or mixing may be according to any common or conventional mixing process and, thus, may conveniently take place on a mill, a Banbury, a Brabender, a twin screw extruder, or the like. When a partial core is utilized, preferably, the three components are first blended and then partially cured, although the styrene-butadiene rubber and the triblock or diblock copolymer can initially be partially cured and then blended with the 1-olefin polymer.

Another method of preparation involves the addition of all dry ingredients including additives, etc., to a styrene-butadiene rubber latex. When the SBR latex is coagulated by standard and well known techniques, all ingredients are intimately mixed. This mixture is then mixed in any manner, as on a mill, at temperatures above the melting point of the polypropylene and the thermoplastic elastomer blend is formed.

If a partial cure is utilized, the curing agent can be conveniently added as well as other conventional processing aids, compounding ingredients, and the like either before or during the blending step. Moreover, the partial core may be achieved under either static conditions (after the blending step) or under dynamic conditions (either during or after the blending step). Under static conditions, the partial cure can be achieved by placing a mixed blend containing the curing agent in an oven and heating it to a desired temperature, whereby partial cure occurs such as at a temperature of from about 65° C. to about 260° C. for approximately 5 to 30 minutes. The dynamic partial cure is achieved by working or processing the blend containing the curing agent on an open mill, in a Banbury, in an extruder, or the like at a temperature sufficient to bring about a partial cure such as from about 75° C. to about 210° C. for approximately 5 to 20 minutes. Should the dynamic cure occur with the blending step, the dynamic blend temperature must be at a temperature above the melting point of the 1-olefin polymer, even if the cure temperature is below the melting point of the 1-olefin polymer.

As noted, the curing agent utilized, when a partial cure is desired, may be any known or conventional rubber curative or method known to those skilled in the art. Variations from standard procedures or compounds may, of course, be utilized. Typical types of curing agents include the sulfur curatives such as sulfur, itself, or sulfur donors, the various peroxides, whether aromatic or aliphatic, and low dosages of irradiation.

If a sulfur curative is utilized, generally from 0.01 to about 1.0 parts by weight per 100 parts of the blend is utilized with the preferred range being from about 0.1 to about 0.2 parts. Some representative examples of sulfur curatives include sulfur, tetramethyl thiorea, 2-(hexamethyleneiminothio)-benzothiazole, sulfur dichloride, sulfur monochloride, alkyl phenol disulfide, and tetramethyl thiuram disulfide. A preferred curative is sulfur, itself. Generally, it is desirable to use from about 1 to about 5 parts per 100 parts of blend of zinc oxide, conventional amounts of stearic acid, and an accelerator since very good antioxidant properties are imparted to the blend. In addition, this particular partial cure system in combination with carbon black surprisingly gives superior paint adhesion. These unexpected results are especially noted with regard to the highly preferred 1-olefin polymer of polypropylene.

The amount of the organic peroxides to effect a partial cure generally varies from about 0.01 to about 0.5 parts by weight per 100 parts of the blend with a preferred range being from about 0.1 to about 0.3. Once again, any conventional peroxide compound may be utilized such as the aromatic diacyl peroxides, the aliphatic diacyl peroxides, dibasic acid peroxides, ketone peroxides, alkyl peroxyesters, alkyl hydroperoxides, and the like. Specific examples include dicumyl peroxide, dibenzoyl peroxide, diacetyl peroxide, bis-2,4-dichlorobenzoyl peroxide, ditertiary-butyl peroxide, tertiary-butylcumyl peroxide, and the like. Of course, the number of the various peroxides is enormous and any of them can be utilized with the above specific compounds merely being representative examples. A preferred peroxide curative is dicumyl peroxide and 2,5-bis(tertiary-butylperoxy)2,5-dimethylhexane.

Multiple peroxide curatives and multiple sulfur curatives, as well as combinations of sulfur and peroxide curatives, can be utilized as well known to those skilled in the art. Furthermore, the amount of the curative range set forth above naturally represents the amount of the active compound. Thus, if a curative is utilized such as dicumyl peroxide in a solvent system, only the weight of dicumyl peroxide, itself, is considered. Additionally, the exact amount of a specific curative utilized to obtain a specific melt flow index will vary from one specific curative to another, depending on the general activity or efficiency of the specific curatives.

Another method of achieving the partial cure involves subjecting the blend to ionizing irradiation. Ionizing rays include alpha rays, beta rays, gamma rays, electron beam, proton rays, neutron rays, and X-rays. In most commercial applications, an accelerated electron beam is utilized. The irradiation is desirably carried out by subjecting pellets or a thin layer of the blend to the irradiation. The irradiation may be admitted from one side or from both sides of the blend composition. The amount of irradiation, of course, will vary with the thickness of the blend composition. In any event, a desirable amount of irradiation is that which results in a partially cured blend having a melt flow index above the index number set forth above. Due to the inherent nature of the irradiation application, the cross-linked density of the styrene-butadiene copolymers will vary with the distance from the irradiated surface. This aspect is acceptable as long as an overall, partially cured system is produced. However, too high of a dose will result in a crosslinked system which cannot be molded or extruded; that is, it is not reprocessable. Generally, when the irradiation is admitted to only one side of the blend composition, the amount of irradiation may vary from about 0.1 to about 5.0 Megarads when an electron accelerator is utilized, and from about 0.1 to about 3.0 Megarads when the irradiation is applied to each side of the blend composition.

In addition to the curing agents, as noted above, other rubber components, compounding agents, fillers, processing aids, colorants, and the like may be added in conventional amounts. Specific types of additives include in addition to accelerators, activators, colorants, antioxidants, flame retardants, ozone-resistant compounds and various processing aids such as oil, stearic acid, and the like. Examples of fillers include carbon black such as from about 0.1 and preferably from about 0.6 parts to about 30 to 40 parts by weight per 100 parts of the blend. Other fillers such as silica, the various clays, calcium carbonate, talc, and the like can be utilized in conventional amounts.

The tricomponent blend of the present invention, whether or not partially cured, generally consists of two continuous phases, with the triblock copolymer, the diblock copolymer, or polystyrene found in the elastomer or SBR phase.

The addition of the third component to the previously disclosed blend of the 1-olefins and SBR generally results in improved properties and surprisingly and unexpectedly results in large improvements in specific properties, especially if the triblock copolymer or the diblock copolymer is utilized. For example, as previously noted, the tensile strength, the elongation at break, and the tear strength exhibited good improvements, even when not partially cured. Additionally and surprisingly, the addition of amounts of the triblock copolymer such as styrene-butadiene-styrene or of the diblock copolymer such as styrene-butadiene results in a blend which has good hot tear and high temperature properties, whereas the triblock or diblock copolymer, by theirself, has poor hot tear and high temperature properties. Moreover, the blend of the present invention has good solvent resistance up to the noted level, whereas prior art styrene-butadiene-styrene and polypropylene has poor solvent resistance. Overall, a tricomponent blend or composition had good minimum creep at high temperatures, good low temperature impact resistance, good ozone and aging resistance, and very good flexibility. However, the solvent resistance, generally when in excess of 30 or 40 parts and especially in excess of 60 parts by weight of the triblock or diblock copolymer was utilized, resulted in a rapid reduction in paint adhesion as well as the various physical properties, since the entire composition lost its structural integrity due to the solubilizing effect of the solvent. Hence, when the tricomponent blend is utilized in solvent situations such as for sight panels on automobiles below the gasoline cap, the amount of the triblock or diblock copolymer naturally is below 60 parts and preferably below 40 or 30 parts. The exact combination of physical properties desired will depend upon the intended applications. For example, in automotive exterior applications, it is imperative that the material be able to withstand inpact at low temperatures. When the same material is used to make a kitchen spatula, low temperature impact is irrelevant. The thermoplastic elastomer tricomponent blends of the present invention are very versatile and flexible in that changes of the composition ratio of SBR and the third component to the 1-olefin polymer and especially to polypropylene, as well as changes of compounding additives, make it possible to generate a wide range of desired physical properties.

The thermoplastic elastomer blends of the present invention may be utilized to produce articles as by molding, extruding, calendaring, vacuum-forming, and the like with specific articles including tubing, gaskets, toys, electrical cable insulation, and household articles. A preferred area of use resides in various automobile parts such as flexible bumpers, dash panels, bumper-filler panels, and the like.

The invention will be better understood with reference given to the various examples.

The following list identifies the various materials used in the examples.

| | |
|---|---|
| Profax 6231 | An isotactic polypropylene with a melt flow index of 30 made by Hercules, Inc. |
| FRS-1502 | A Firestone "cold" emulsion polymerized SBR copolymer with 23.5 percent bound styrene, ML/4/212 = 45. |
| Kraton 1101 | A styrene-butadiene-styrene triblock copolymer manufactured by Shell. |
| FEF carbon black | An N550 carbon black. |
| TMTD (tetramethylthiuram disulfide) | A vulcanization accelerator manufactured by Vanderbilt. |
| Irganox | An antioxidant made by Ciba-Ceigy Chemical corporation |

EXAMPLES A THROUGH G

DRY MIXING

The styrene-butadiene rubber was sheeted out on a two-roll mill at a temperature between 90° to 120° C. The remaining ingredients, as set forth in Table I, were added and milling was continued until the additives were well dispersed within the rubber. The blend was then cut into strips so that it could easily be fed into the twin screw extruder. The material was extruded at 200° C. into a quenching water bath and subsequently chopped into small pellets which were then injection molded into plaques (15.2×10.2×0.2 cm). The plaques were tested for physical properties. Table I sets forth the compositions of the various blends and Table II sets forth the properties of the blends. All tests were according to ASTM standards, except for the paint adhesion test which will now be described in more detail.

PAINT ADHESION TEST

Before painting, a test plaque was first washed with a mild alkaline solution and water-rinsed. After drying, the plaque was then sprayed with Seibert Oxidermo primer and flash dried for at least 2 minutes. A topcoat of Durethane 100 was then applied and cured for 40 minutes at 120° C. The paint scuff resistance was evaluated by scratching the painted surface with the edge of a dime. For surfaces showing excellent paint adhesion, the paint could not be scraped cleanly from the substrate. When adhesion was poor, the paint could be easily stripped off with only mild pressure exerted on the dime.

TABLE I

| COMPOSITIONS | A | B | C | D | E | F | G |
|---|---|---|---|---|---|---|---|
| FRS-1502 | 62 | 57 | 52 | 47 | 42 | 37 | 32 |
| Profax 6231 | 38 | 38 | 38 | 38 | 38 | 38 | 38 |
| Kraton 1101 | 0 | 5 | 10 | 15 | 20 | 25 | 30 |
| FEF carbon black | 5 | 5 | 5 | 5 | 5 | 5 | 5 |
| ZnO | 3 | 3 | 3 | 3 | 3 | 3 | 3 |
| Stearic acid | 1 | 1 | 1 | 1 | 1 | 1 | 1 |
| TMTD | 0.2 | 0.2 | 0.2 | 0.2 | 0.2 | 0.2 | 0.2 |
| Sulfur | 0.1 | 0.1 | 0.1 | 0.1 | 0.1 | 0.1 | 0.1 |
| Irganox 1076 | 0.3 | 0.3 | 0.3 | 0.3 | 0.3 | 0.3 | 0.3 |

TABLE II

| PROPERTIES | A | B | C | D | E | F | G |
|---|---|---|---|---|---|---|---|
| Stress to break (MPa) | 5.12 | 5.47 | 6.21 | 6.96 | 7.67 | 9.54 | 11.2 |
| Strain to break | 2.46 | 2.77 | 3.69 | 4.38 | 4.91 | 6.42 | 7.51 |
| Tear (kN/m) | 43.3 | 51.1 | 55.7 | 61.0 | 65.2 | 69.4 | 72.2 |
| 100° C. Tear (kN/m) | 19.7 | 20.1 | 22.0 | 20.8 | 21.4 | 22.8 | 23.4 |
| Solvent Resistance | Good | Good | Good | Fair | Fair | Fair | Poor |
| Paint Adhesion dime scratch | Good | Good | Good | Good | Good | Good | Good |

As apparent from Table II, noticeable improvements occurred in the tensile strength and tear strength. Additionally, Table II reveals that the larger the amount of the triblock SBS block copolymer, the more easily the surface is marred. In fact, in Example G, a person's fingernail easily gouged and removed strips of the samples upon the application of a slight force. Thus, it is readily apparent that the solvent resistance drops off with increased SBS content and therefore, in solvent situations, the properties of the blend are also reduced.

Solvent resistance was measured by dipping a sample in a solvent mixture of 50/50 naphtha/toluene for several minutes and then by scratching the surface to determine mar resistance.

While in accordance with the patent statutes, various preferred embodiments have been illustrated and described in detail, it is to be understood that the invention is measured by the scope of the attached claims.

What is claimed is:

1. A thermoplastic elastomer composition, comprising; a blend of
   from about 10 to about 48 parts by weight of a crystalline 1-olefin polymer, said 1-olefin polymer selected from the class consisting of a homopolymer and a copolymer made from 1-olefin monomers having from 2 to 20 carbon atoms, said homopolymer or said copolymer having a melting point of at least 90° C.,
   from about 90 to about 10 parts by weight of a random styrene-butadiene copolymer rubber, and
   a compound selected from the class consisting of a triblock copolymer, a diblock copolymer, and combinations thereof, the amount of said triblock and said diblock copolymer or combinations thereof ranging from about 0.1 to about 80 parts by weight, said triblock copolymer and said diblock copolymer made from conjugated dienes having from 4 to 10 carbon atoms and a vinyl substituted aromatic having from 8 to 12 carbon atoms,
   said blend forming said thermoplastic elastomer.

2. A thermoplastic elastomer composition according to claim 1, wherein said 1-olefin homopolymer is selected from the class consisting of polyethylene and polypropylene, wherein said 1-olefin copolymer consists of polyethylene and polypropylene, wherein said conjugated diene is selected from the class consisting of isoprene, butadiene, piperylene, 2,3-dimethylbutadiene, and hexadiene, and wherein said vinyl substituted aromatic compound is selected from the class consisting of styrene, alphamethylstyrene, and isomers of methyl styrene, and the isomers of ethyl styrene.

3. A thermoplastic elastomer composition according to claim 2, wherein the amount of said 1-olefin polymer ranges from about 30 to about 42 parts by weight, wherein the amount of said random styrene-butadiene copolymer rubber ranges from about 70 to about 11 parts by weight, wherein the amount of said triblock or said diblock copolymer or combinations thereof ranges from about 0.5 to about 60 parts by weight.

4. A thermoplastic elastomer composition according to claim 3, wherein said 1-olefin homopolymer is polypropylene, wherein said 1-olefin copolymer is made from a major amount by weight of propylene monomers and a minor amount of ethylene monomers, wherein said diene monomer is butadiene and wherein said vinyl substituted aromatic is selected from the class consisting of styrene and alpha-methylstyrene.

5. A thermoplastic elastomer composition according to claim 4, wherein the molecular weight of said random styrene-butadiene copolymer rubber ranges from about 50,000 to about 1,000,000, wherein the diene portion of said triblock or said diblock copolymer has the molecular weight of from about 25,000 to about 200,000, and wherein the vinyl substituted aromatic portion of said triblock or said diblock copolymer has a molecular weight of from about 7,500 to about 50,000.

6. A thermoplastic elastomer composition according to claim 5, wherein the amount of said random styrene-butadiene copolymer rubber ranges from about 50 parts to about 11 parts by weight, wherein said compound selected from the class consisting of a triblock copolymer, a diblock copolymer, and combinations thereof is a triblock copolymer, and wherein the amount of said triblock copolymer ranges from about 0.9 to about 30 parts by weight.

7. A thermoplastic elastomer composition according to claim 2 or claim 5, wherein said 1-olefin polymer contains from about 0 to about 15 percent by weight of atactic polypropylene.

8. A thermoplastic elastomer composition according to claim 6, wherein the melting point of said 1-olefin polymer is at least 150° C.

9. A thermoplastic elastomer composition, comprising; a blend of
from about 10 to about 48 parts by weight of a crystalline 1-olefin polymer, said 1-olefin polymer selected from the class consisting of a homopolymer and a copolymer made from 1-olefin monomers having from 2 to 20 carbon atoms, said homopolymer or said copolymer having a melting point of at least 90° C.,
from about 90 to about 10 parts by weight of a random styrene-butadiene copolymer rubber, and
a compound selected from the class consisting of a triblock copolymer, a diblock copolymer, and combinations thereof, the amount of said triblock and said diblock copolymer of combinations theory ranging from about 0.1 to about 80 parts by weight said triblock copolymer and said diblock copolymer made from conjugated dienes having from 4 to 10 carbon atoms and a vinyl substituted aromatic having from 8 to 12 carbon atoms,
said blend being partially cured and having a melt flow index of at least 1.0 so that a thermoplastic elastomer is formed.

10. A thermoplastic elastomer composition according to claim 9, wherein said 1-olefin homopolymer is selected from the class consisting of polyethylene and polypropylene, wherein said 1-olefin copolymer consists of polyethylene and polypropylene, wherein said conjugated diene is selected from the class consisting of isoprene, butadiene, piperylene, 2,3-dimethylbutadiene and hexadiene, and wherein said vinyl substituted aromatic compound is selected from the class consisting of styrene, alpha-methylstyrene, the isomers of methyl styrene, and the isomers of ethyl styrene.

11. A thermoplastic elastomer composition according to claim 10, wherein the amount of said 1-olefin polymer ranges from about 30 to about 42 parts by weight, wherein the amount of said random styrene-butadiene copolymer rubber ranges from about 70 to about 11 parts by weight, wherein the amount of said triblock or said diblock copolymer or combinations thereof ranges from about 0.5 to about 60 parts by weight.

12. A thermoplastic elastomer composition according to claim 11, wherein said 1-olefin homopolymer is polypropylene, wherein said 1-olefin copolymer is made from a major amount by weight of propylene monomers and a minor amount of ethylene monomers, wherein said diene monomer is butadiene, wherein said vinyl substituted aromatic is selected from the class consisting of styrene and alpha-methylstyrene, and wherein said melt flow index is at least 10.

13. A thermoplastic elastomer composition according to claim 12, wherein the molecular weight of said random styrene-butadiene copolymer rubber ranges from about 50,000 to about 100,000, wherein the diene portion of said triblock or said diblock copolymer has the molecular weight of from about 25,000 to about 200,000, wherein the vinyl substituted aromatic portion of said triblock or said diblock copolymer has a molecular weight of from about 7,500 to about 50,000, wherein said partial cure is obtained utilizing a compound selected from the class consisting of a sulfur curative and an organic peroxide curative, the amount of said sulfur curative ranging from about 0.01 parts to about 1.0 parts by weight per 100 parts of said blend, and wherein the amount of said organic peroxide curative ranges from about 0.1 to about 0.5 parts per 100 parts of said blend.

14. A thermoplastic elastomer composition according to claim 13, wherein the amount of said random styrene-butadiene copolymer rubber ranges from about 50 parts to about 11 parts by weight, wherein said composition selected from the class consisting of a triblock copolymer, a diblock copolymer, and combinations thereof is a triblock copolymer, and wherein the amount of said triblock copolymer ranges from about 0.9 to about 30 parts by weight, and wherein the melt flow index ranges from about 90 to about 15.

15. A thermoplastic elastomer composition according to claim 10 or claim 13, wherein said 1-olefin polymer contains from about 0 to about 15 percent by weight of atactic polypropylene.

16. A thermoplastic elastomer composition according to claim 13, wherein the melting point of said 1-olefin polymer is at least 150° C., and wherein said curative is a sulfur curative, and including from about 1 to about 5 parts by weight of zinc oxide per 100 parts of said blend.

17. A process for making a thermoplastic elastomer blend composition, comprising the steps of:
providing a blend of a 1-olefin polymer, a random styrene-butadiene copolymer rubber, and a compound selected from the group consisting of a triblock copolymer, a diblock copolymer, and combinations thereof,
said blend having from about 10 to about 48 parts by weight of said crystalline 1-olefin polymer, said 1-olefin polymer selected from the class consisting of a homopolymer and a copolymer made from 1-olefin monomers having from 2 to about 20 carbon atoms, said homopolymer or said copolymer having a melting point of at least 90° C.,
from about 90 to about 10 parts by weight of said random styrene-butadiene copolymer rubber, and
the amount of said triblock and said diblock copolymer or combinations thereof ranging from about 0.1 to about 80 parts by weight, said triblock copolymer and said diblock copolymer made from conjugated dienes having from 4 to 10 carbon atoms and a vinyl substituted aromatic having from 8 to 12 carbon atoms, and
heating said blend at a temperature at or above the melting point of said crystalline 1-olefin polymer so that a reprocessable thermoplastic elastomer blend is formed.

18. A process according to claim 17, wherein the amount of said 1-olefin polymer ranges from about 30 to about 42 parts by weight, wherein the amount of said random styrene-butadiene copolymer rubber ranges from about 70 to about 11 parts by weight, wherein the amount of said triblock or said diblock copolymer or combinations thereof ranges from about 0.5 to about 60 parts by weight, wherein said 1-olefin polymer is polypropylene, wherein said 1-olefin copolymer is made from a major amount by weight of propylene monomers and a minor amount of ethylene monomers, wherein said diene monomer is butadiene and wherein said vinyl substituted aromatic is selected from the class consisting of styrene and alpha-methylstyrene.

19. A process according to claim 18, wherein the molecular weight of said random styrene-butadiene copolymer rubber ranges from about 50,000 to about 1,000,000, wherein said compound selected from the class consisting of a triblock copolymer, a diblock copolymer, and combinations thereof is a triblock copolymer, wherein the diene portion of said triblock copolymer has the molecular weight of from about 25,000 to about 200,000, and wherein the vinyl substituted aromatic portion of said triblock copolymer has a molecular weight of from about 7,500 to about 50,000.

20. A process according to claim 19, wherein the amount of said random styrene-butadiene copolymer rubber ranges from about 70 to about 11 parts by weight, and wherein the amount of said triblock copolymer ranges from about 0.5 to about 60 parts by weight.

21. A process according to claim 18 or claim 20 including from 0 and up to about 15 percent by weight of an atactic polypropylene.

22. A process for making a thermoplastic elastomer blend composition, comprising the steps of:
providing a blend of a 1-olefin polymer, a random styrene-butadiene copolymer rubber, and a compound selected from the group consisting of a triblock copolymer, a diblock copolymer, and combinations thereof,
said blend having from about 10 to about 48 parts by weight of said crystalline 1-olefin polymer, said 1-olefin polymer selected from the class consisting of a homopolymer and a copolymer made from 1-olefin monomers having from 2 to about 20 carbon atoms, said homopolymer or said copolymer having a melting point of at least 90° C.,
from about 90 to about 10 parts by weight of said random styrene-butadiene copolymer rubber, and
the amount of said triblock and said diblock copolymer or combinations thereof ranging from about 0.1 to about 80 parts by weight, said triblock copolymer and said diblock copolymer made from conjugated dienes having from 4 to 10 carbon atoms and a vinyl substituted aromatic having from 8 to 12 carbon atoms, and
heating said blend at a temperature at or above the melting point of said 1-olefin polymer, and partially curing said blend to have a melt flow index of at least 1.0 so that a reprocessable thermoplastic elastomer blend is produced.

23. A process according to claim 22, wherein the amount of said 1-olefin polymer ranges from about 30 to about 42 parts by weight, wherein the amount of said random styrene-butadiene copolymer rubber ranges from about 70 to about 11 parts by weight, wherein the amount of said triblock or said diblock copolymer or combinations thereof ranges from about 0.5 to about 60 parts by weight, wherein said 1-olefin polymer is polypropylene, wherein said 1-olefin copolymer is made from a major amount by weight of propylene monomers and a minor amount of ethylene monomers, wherein said diene monomer is butadiene, wherein said vinyl substituted aromatic is selected from the class consisting of styrene and alpha-methylstyrene, and wherein said melt flow index of said blend is at least 10.

24. A process according to claim 23, wherein the molecular weight of said random styrene-butadiene copolymer rubber ranges from about 50,000 to about 1,000,000, wherein said compound selected from the class consisting of a triblock copolymer, a diblock copolymer, and combinations thereof is a triblock copolymer, wherein the diene portion of said triblock copolymer has the molecular weight of from about 25,000 to about 200,000, and wherein the vinyl substituted aromatic portion of said triblock copolymer has a molecular weight of from about 7,500 to about 50,000, and wherein said partial cure is obtained utilizing a compound selected from the class consisting of a sulfur curative and an organic peroxide curative, the amount of said sulfur curative ranging from about 0.1 to about 1.0 parts by weight per 100 parts of said blend, and wherein the amount of said organic peroxide curative ranges from about 0.1 to about 0.5 parts per 100 parts of said blend.

25. A process according to claim 24, wherein the amount of said 1-olefin polymer ranges from about 30 to about 42 parts by weight, wherein the amount of said random styrene-butadiene copolymer rubber ranges from about 70 to about 11 parts by weight, wherein the amount of said triblock copolymer ranges from about 0.5 to about 60 parts by weight, and wherein said melt flow index ranges from about 90 to about 150.

26. A process according to claim 23 or claim 25, including from 0 and up to about 15 percent by weight of an atactic polypropylene.

27. A process according to claim 25, wherein said curative is a sulfur curative, and including from about 1 to about 5 parts by weight of said zinc oxide per 100 parts of said blend.

28. A thermoplastic elastomer composition according to claim 2 or 6, wherein said thermoplastic elastomer composition has good high temperature physical properties.

29. A thermoplastic elastomer composition according to claim 28, wherein said high temperature is approximately 100° C.

30. A thermoplastic elastomer composition according to claim 2 or 6, wherein said thermoplastic elastomer composition has good high temperature tear properties.

31. A thermoplastic elastomer composition according to claim 30, wherein said high temperature is approximately 100° C.

32. A thermoplastic elastomer composition according to claim 2 or 6, wherein said thermoplastic elastomer composition has good paint adhesion.

33. A thermoplastic elastomer composition according to claim 2, wherein said thermoplastic elastomer composition has fair to good solvent resistance.

34. A thermoplastic elastomer composition according to claims 10 or 14, wherein said thermoplastic elastomer composition has good high temperature physical properties.

35. A thermoplastic elastomer composition according to claims 10 or 14, wherein said high temperature is approximately 100° C.

36. A thermoplastic elastomer composition according to claims 10 or 14, wherein said thermoplastic elastomer composition has good high temperature tear properties.

37. A thermoplastic elastomer composition according to claims 10 or 14, wherein said high temperature is approximately 100° C.

38. A thermoplastic elastomer composition according to claims 10 or 14, wherein said thermoplastic elastomer composition has good paint adhesion.

39. A thermoplastic elastomer composition according to claims 10 or 14, wherein said thermoplastic elastomer composition has fair to good solvent resistance.

40. A process according to claims 18 or 20, wherein said thermoplastic elastomer composition has good high temperature physical properties.

41. A process according to claims 18 or 20, wherein said high temperature is approximately 100° C.

42. A process according to claims 18 or 20, wherein said thermoplastic elastomer composition has good high temperature tear properties.

43. A process according to claims 18 or 20, wherein said high temperature is approximately 100° C.

44. A process according to claims 18 or 20, wherein said thermoplastic elastomer composition has good paint adhesion.

45. A process according to claims 18 or 20, wherein said thermoplastic elastomer composition has fair to good solvent resistance.

46. A process according to claims 23 or 25, wherein said thermoplastic elastomer composition has good high temperature physical properties.

47. A process according to claims 23 or 25, wherein said high temperature is approximately 100° C.

48. A process according to claims 23 or 25, wherein said thermoplastic elastomer composition has good high temperature tear properties.

49. A process according to claims 23 or 25, wherein said high temperature is approximately 100° C.

50. A process according to claims 23 or 25, wherein said thermoplastic elastomer composition has good paint adhesion.

51. A process according to claims 23 or 25, wherein said thermoplastic elastomer composition has fair to good solvent resistance.

* * * * *